United States Patent
Krammel

(10) Patent No.: US 11,801,892 B2
(45) Date of Patent: Oct. 31, 2023

(54) VEHICLE WITH TILT FRAME AND SPRING DAMPER SYSTEM

(71) Applicant: Werner Krammel, Bad Abbach (DE)

(72) Inventor: Werner Krammel, Bad Abbach (DE)

( * ) Notice: Subject to any disclaimer, the term of this patent is extended or adjusted under 35 U.S.C. 154(b) by 103 days.

(21) Appl. No.: 17/430,502

(22) PCT Filed: Jan. 20, 2020

(86) PCT No.: PCT/EP2020/051244
§ 371 (c)(1),
(2) Date: Aug. 12, 2021

(87) PCT Pub. No.: WO2020/164861
PCT Pub. Date: Aug. 20, 2020

(65) Prior Publication Data
US 2022/0135124 A1    May 5, 2022

(30) Foreign Application Priority Data
Feb. 12, 2019 (DE) .......................... 102019103438.8

(51) Int. Cl.
*B62D 9/02* (2006.01)
*B60G 17/016* (2006.01)
(Continued)

(52) U.S. Cl.
CPC ........... *B62D 9/02* (2013.01); *B60G 17/0162* (2013.01); *B62D 7/228* (2013.01); *B62K 5/08* (2013.01); *B60G 2500/10* (2013.01)

(58) Field of Classification Search
CPC ...... B62D 9/02; B62D 7/228; B60G 17/0162; B60G 2500/10; B62K 5/08;
(Continued)

(56) References Cited

U.S. PATENT DOCUMENTS

| 5,950,751 A | * | 9/1999 | McComber | ............... B60K 1/00 180/215 |
| 2007/0246901 A1 | * | 10/2007 | Houser | .................. B62D 17/00 280/5.521 |
| 2008/0197597 A1 | * | 8/2008 | Moulene | .................. B62K 5/10 280/5.509 |

(Continued)

FOREIGN PATENT DOCUMENTS

| DE | 102012107154 A1 | 2/2014 |
| DE | 102014101087 A1 | 7/2015 |

(Continued)

OTHER PUBLICATIONS

Search Report dated Apr. 3, 2020 in corresponding International Application No. PCT/EP2020/051244, 6 pages.

*Primary Examiner* — Drew J Brown
*Assistant Examiner* — Shams Dhanani
(74) *Attorney, Agent, or Firm* — MH2 TECHNOLOGY LAW GROUP LLP

(57) ABSTRACT

A vehicle with a base frame to which at least two sprung suspensions, in particular sprung wheel suspensions, for driven, non-driven, steerable or non-steerable contact elements, for example wheels, are attached which can be steered by means of a steering knuckle and are located on both sides of the longitudinal direction of travel, in each case transversely to the direction of travel, a tilt frame, tiltable in a tilt axis with respect to the base frame. A steering tube is rotatably attached to the tilt frame in the steering axis and automatically tilts with the tilt frame, at least one track rod connected to the track rod actuating element, and a linear or rotary track rod actuating element rotatable over a guide element. The track rod actuating element is displaced by tilting the tilt frame about the tilt axis and independently thereof by rotating the steering tube about the steering axis in such a way that the steerable contact element is given a steering movement by the track rod actuating element by means of the at least one track rod and no substantial change (Continued)

in the camber of the contact elements takes place during cornering, wherein the vehicle comprises at least one spring damper system which is suitable and provided for reducing a pendulum tilt of a tilt frame about the vertical zero position.

14 Claims, 10 Drawing Sheets

(51) Int. Cl.
    *B62D 7/22*     (2006.01)
    *B62K 5/08*     (2006.01)

(58) Field of Classification Search
    CPC ...... B62K 2005/001; B62K 5/01; B62K 5/10; B62B 13/046; B62B 17/062; B62M 27/02; B62M 2027/026; B62M 2027/028
See application file for complete search history.

(56) References Cited

U.S. PATENT DOCUMENTS

| | | | | |
|---|---|---|---|---|
| 2013/0168944 | A1* | 7/2013 | Bartolozzi | B62K 5/05 |
| | | | | 280/269 |
| 2020/0102037 | A1* | 4/2020 | Hirayama | B62K 5/10 |

FOREIGN PATENT DOCUMENTS

| | | | |
|---|---|---|---|
| DE | 102014101087 B4 | 7/2015 | |
| DE | 102014215979 A1 | 2/2016 | |
| DE | 202015105238 U1 | 1/2017 | |
| DE | 202014010970 U1 | 2/2017 | |
| DE | 102017001557 A1 | 8/2018 | |
| FR | 2836447 A1 | 8/2003 | |
| FR | 2937000 A1 | 4/2010 | |
| FR | 2995869 A1 * | 3/2014 | ........... B60G 17/005 |
| GB | 2472205 A * | 2/2011 | ............... B62K 5/01 |
| JP | 85172034 A | 6/1976 | |
| JP | S5172034 A | 6/1976 | |
| WO | 2011061128 A1 | 5/2011 | |

\* cited by examiner

VEHICLE WITH TILT FRAME AND SPRING DAMPER SYSTEM

CROSS-REFERENCE TO RELATED APPLICATIONS

This application is a U.S. 371 National Stage application of PCT/EP2020/051244 filed Jan. 20, 2020, pending, which claims priority to German Application No. DE 10 2019 103 438.8, filed Feb. 12, 2019, the entire disclosures of which are hereby incorporated by reference.

The invention relates to a vehicle with a base frame to which at least two contact elements, for example wheels, skids or caterpillar tracks, which can be steered by means of Ackermann steering and are opposite each other on both sides of the longitudinal direction of travel (transverse direction) are attached.

Preferably, the vehicle comprises at least one track rod and at least one track rod actuating element.

In the context of the invention disclosed in the present application, the term "track rod" includes any design of a steering transmission element with which a movement of the track rod actuating element is transmitted to the steering knuckle steering of the steerable contact element.

The term "steering knuckle" also includes wheel hub steering systems, such as those occasionally used on motorbikes.

The track rod actuating element is functionally arranged—in a steering gear—between the steering tube and the track rod and transmits a steering and/or tilting movement caused by the vehicle driver to the track rod(s), whereby the direction of travel of the vehicle is changed via the at least one steerable contact element. In particular, the track rod actuating element is movably mounted in a guide element in which the track rod actuating element can be axially displaced or rotated.

In addition, the vehicle comprises a tilt frame which can be tilted relative to the base frame and has a tilt axis, as well as a steering tube with a steering axis running obliquely or perpendicularly to the tilt axis, wherein the steering tube is mechanically connected to the tilt frame and wherein the two contact elements are attached to the base frame on both sides of a longitudinal direction of travel of the tilt frame in a sprung manner.

In a vehicle designed in this way, the vehicle driver can lie down in the curve while driving together with the tilt frame. For example, triggered by the steering movement during cornering, the camber of the steerable contact element(s) does not change or does not change significantly. Slight camber changes due to chassis kinematics are of course still possible.

Furthermore, the two contact elements are attached to the base frame on both sides of a longitudinal direction of travel of the tilt frame, for example via inward and outward springing wheel carriers.

If the contact elements are, for example, wheels and are fixed to the base frame, for example via a single wheel suspension with a spread or by caster, i.e. an axis that is not completely vertical, an insignificant change in camber occurs when the wheels are steered in by the chassis kinematics.

Furthermore, the camber also changes, but in particular insignificantly, due to the springing in and out of the wheel suspension. For example, a geometric position and an angle of the upper and lower wheel suspension and the bearings of the swivel axle for the rotatable steering knuckle change.

The feature that the wheels and/or runners are fixed to the base frame, for example, in such a way that the camber does not change or changes only insignificantly when turning into the curve, means that a maximum contact surface between the tire and the ground is maintained even when cornering in the case of tires with an essentially flat tread. Maintaining the maximum contact area between the tire and the ground when cornering significantly increases safety, as more friction surface is available between the tire and the ground. On the other hand, the full tread surface is also available when cornering, which means that the tread surface optimised by the tire manufacturer is also completely available for the vehicle's drive and braking process when cornering.

Alternatively, it is conceivable that the camber only changes for the two front contact elements (for example the front wheels) or for the two rear contact elements (for example the rear wheels) not at all or only insignificantly.

There is no significant change in the camber of the wheels and tires when turning into a bend, such as when leaning into a bend while riding a motorbike, and a consequent reduction in the tire contact area and the grip between tire and ground.

By constructing a tilt frame that can be tilted by a vehicle driver relative to a base frame to which the contact elements are fixed, it is achieved that the tilt frame can be tilted towards the inside of the curve by the vehicle driver according to the curve radius and the curve speed and thus against the centrifugal force.

An exemplary design of a steering gear is shown in DE 10 2014 101 087 B4, where corresponding mechanical components are arranged between the steering tube and the track rod element, whereby the specific geometric arrangement results in an actuation of the track rods by tilting the tilt frame and/or turning the swivel steering.

In one embodiment of the invention, the vehicle has a stabiliser. This stabiliser is designed and intended to ensure improved driving stability on the sprung wheel suspensions of the vehicle during cornering. Preferably, this stabiliser also has an effect on the cornering behaviour of the vehicle in that the stabiliser reduces rolling of the chassis or base frame.

Such a stabilising element could, for example, be installed in the area of the front axle or also in the area of the rear axle. In addition, a stabilising element on both axles is also conceivable. The stabilising element can, for example, be arranged along an axle between two rotatable or steerable contact elements of a vehicle.

In a further preferred embodiment, the vehicle has a drive unit which is set up and intended to supply the vehicle with a drive force or a drive torque. This drive unit can preferably be arranged in different ways or on different areas of a vehicle. It is possible, for example, that the drive unit is firmly connected to a base frame. This base frame is characterised, for example, by the fact that it does not move or tilt in relation to the tilt frame.

It is also possible to place the drive unit on the rear swing arm of the drive axle. In this case, the drive unit does not tilt with the tilt frame.

Another possibility is to arrange the drive unit in or on a tilting frame so that this drive unit moves with or follows the inclination of the tilting frame. The tilt frame is characterised, for example, by the fact that it can tilt in relation to the base frame, for example to the right or left as seen in the direction of travel. By arranging the drive unit in the tilt frame, more mass is moved with the tilt frame, which reduces the tilt tendency in the curve. Such an arrangement therefore provides additional safety. To bridge a tilting movement between the tilt frame and the base frame and to transmit a drive torque from the drive unit in the tilt frame to a drive element, for example a drive wheel or drive pinion, a swivel gear can be provided in the base frame.

This part-turn gearbox preferably has at least one ball drive joint. In order to increase the tilt mobility of the part-turn gearbox, two ball drive joints can preferably also be provided in the part-turn gearbox.

Preferably, a drive wheel or pinion can be provided on the gearbox in the tilting frame parallel to the tilting plane of the tilting frame and a swivel wheel or pinion can be provided on the ball drive joint of the swivel gearbox, which is connected to the drive wheel or pinion via a power transmission means.

A chain or toothed belt is usually used as the power transmission means. The power transmission means and the swivel wheel or pinion of the part-turn gearbox are also arranged in the same plane as the drive wheel or pinion. Thus, for example, the swivel wheel or pinion of the swivel gear and the drive wheel or pinion can be arranged one behind the other or offset one behind the other, but for example at the same height starting from the ground on which the contact elements rest. By forming the drive wheel or pinion parallel to the inclinable plane of the tilt frame, a power transmission from the inclined tilt frame via the swivel gear to the wheels is made possible without generating an upward moment of the drive wheel or pinion on the tilt frame. This is of crucial importance because, for example, if the transmission were connected to the rear drive axle via a cardan shaft aligned in the direction of travel, a moment would be generated on the tilt frame during acceleration and braking and the vehicle driver would have to additionally control this during acceleration and braking. Due to the arrangement of the drive wheel or pinion in a plane parallel to the plane of the tiltable frame and the swivel gear, no setting-up torque acts on the tilt frame during acceleration and braking, so that it neither sets up nor is depressed during acceleration and braking.

In another embodiment, the vehicle may, for example, have a rigid rear axle, which may, for example, be sprung relative to a base frame via a spring damper system. This may be the case, for example, in a so-called quad with a rigid rear axle.

For this purpose, for example, the rear axle can be connected via a swing arm to a swing axle provided on the base frame, around which the rear axle can move against the spring force in the spring damper system. Preferably, the drive unit can also be arranged on the swing arm.

It should be noted that the aforementioned drive unit can be, for example, an internal combustion engine, but an electric motor or even a simple pedal drive cannot be ruled out.

configurations. For example, it would be possible for the vehicle to have four contact elements, for example tires. For example, it would be possible for both a front axle and a rear axle to each have two contact elements.

However, other designs cannot be ruled out. For example, it would also be possible for the vehicle to have only three contact elements, whereby these contact elements can also be tires. It is also conceivable that the vehicle has only three contact elements, whereby either two contact elements are arranged on a front axle and one contact element on a rear axle or vice versa.

In another design, the vehicle also has three contact elements, but here, for example, the two front contact elements are not designed as tires, but as skids, which are used for steering. As a third contact element, the vehicle could have a drive caterpillar, as is the case with a snowmobile, for example.

Furthermore, it would also be possible to imagine a watercraft with a drive turbine or drive propeller, in which the direction of travel of the watercraft is changed accordingly by tilting a tilt frame/structure and/or by turning the pivot steering angle, which is connected to a steerable drive turbine/drive nozzle or steering float elements.

In one embodiment according to the invention, the vehicle has, for example, a differential gear, in particular a differential gear in a drive axle or between drive shafts of the vehicle. Thus, a vehicle is provided which enables improved driving stability, in particular when entering curves at very high speeds. These differential gears also include self-locking differentials, load-dependent or speed-dependent self-locking differentials, shiftable and non-shiftable differential gears.

Preferably, the differential gear serves to stabilise cornering of the vehicle and to compensate for differences in speed and torque between the two contact elements arranged and driven on either side of the base frame.

By using a differential gear, especially for rigid drive axles, the cornering speed can be kept as constant as possible during the transition to cornering. It is particularly advantageous that the cornering speed can be kept constant, especially during the transition from driving straight ahead to cornering, and that there is no surprising reduction in the cornering speed.

With regard to such a differential gear, for example, the application of a differential gear in which the, for example, only the front contact elements are driven is conceivable. This can also be done by mounting the drive unit in the base frame at the front between the front contact elements with split drive shafts, resulting in a front-wheel drive vehicle. Such a design on the rear axle, whereby a rear-wheel drive is achieved, is by no means excluded. In addition, the differential gears can be used between the driven front axles and rear axles in four-wheel drive vehicles.

Furthermore, the vehicle can preferably have a rigid front axle or a rigid rear axle, depending on the variant. For example, the rigid axle could also be designed as a drive axle.

In the previously shown embodiment example, in which the vehicle has wheels as contact elements, these can, for example, be fixed to the base frame via an independent wheel suspension. For example, the vehicle can have an upper and a lower wheel suspension at the front. For example, the respective contact elements, such as wheels or skids, can be provided on the lower wheel suspension and the upper wheel suspension. In this case, for example, the front wheels are rotatably arranged relative to a base frame on one steering knuckle each on the upper wheel suspension and the lower wheel suspension. A sprung independent wheel suspension can also be provided, which for example consists of an upper and lower wheel suspension and a spring damper element.

According to the present invention, the steering of a vehicle could be effected in different ways. Both when a steering tube is rotated clockwise and when the tilt frame is tilted clockwise (in each case as seen in the direction of travel), a track rod actuating element is displaced linearly to the left transversely in the direction of travel by rotation of a steering column shaft connected to a gear segment and its rotational movement in a guide element, so that the front contact elements, for example wheels, are rotated clockwise about their steering knuckles and thus experience a steering movement to the right as seen in the direction of travel. When the steering tube is rotated anti-clockwise as well as when the tilt frame is tilted anti-clockwise, the front contact elements experience a steering movement to the left in an analogous manner. The inclination of the tilt frame in the respective direction could be achieved, for example, by shifting the weight of the driver.

In one embodiment according to the invention, the steering can be designed in such a way that the track rod is arranged by means of ball joints on a linearly moved track rod actuating element, wherein the linearly moved track rod actuating element is connected via a gear segment, via a steering column shaft rotatably mounted in a guide element, via universal joints to the steering column with a handlebar. When the handlebar is actuated or the handlebar is rotated clockwise (as seen in the direction of travel), the linear track rod actuating element is actuated via the steering column, which results in the contact elements, which are arranged on the track rod, for example by means of a steering lever via a ball joint, experiencing a rotational movement or steering movement to the left. This is not only possible by turning the steering column clockwise, but also by tilting the tilt frame clockwise. This steering movement takes place in an analogous manner to the right when the handlebars or the tilt frame are rotated/tilted counterclockwise. Further details can be found in the attached drawings.

Further alternatively, in an embodiment according to the invention, the steering can also be designed in such a way that it does not have a linearly moved track rod element, but a rotationally moved track rod actuating element, which is rotationally mounted in a guide element via a steering column shaft. The guide element is firmly connected to the base frame. In such an embodiment, the steering has two tie rods, which can each receive a contact element via steering knuckles arranged thereon by means of wheel carriers. The track rods are each connected to the rotationally movable track rod actuating element, for example via ball heads or the like. Here, too, the steering, i.e. the rotation of the contact elements, can be effected either by the rotation of the handlebar and/or by an inclination of the tilt frame. Furthermore, a rotation of the handlebar and an inclination of the tilt frame can be carried out at the same time. Again, further details can be found in the attached drawings.

In a preferred embodiment, a steering system has a hydraulic steering damper so that, for example, possible road irregularities can be damped when cornering and these do not directly affect the steering elements.

Furthermore, in another embodiment, vehicles may be equipped with electronic systems that comply with the law, such as ABS (anti-lock braking systems) or ESP (electronic stabilisation programme), wheel speed sensors, gyro sensors, anti-slip control and other control systems that may serve the safety of the vehicle and the driver.

However, it was discovered by the inventor that such a chassis design, when driving straight ahead at high speeds, causes the tilting frame to oscillate around the vertical zero position from within the chassis and is generated by the driver himself, which impairs the driver's subjective perception of driving safety.

Various types of vehicles are known from the prior art.

For example, a snowmobile is known from U.S. Pat. No. 7,946,371, in which the body, including the engine and drive, can tilt into a curve relative to the front chassis by using a rotationally acting torsion spring between the tiltable body and the chassis.

U.S. Pat. No. 7,722,063 shows a vehicle with a tilting technique in which the body is tilted by a drive unit.

FR 2 946 944 also describes a vehicle with tilting technology and a very complex steering mechanism with several cable pulls.

U.S. Pat. No. 7,249,647 describes a steering mechanism for a snowmobile that is adapted to exert a higher pressure on the outer ski than on the inner ski when making a turn. The steering mechanism is adapted in such a way that it includes the suspension in the steering movement of the snowmobile.

U.S. Pat. No. 6,234,262 discloses a steering and suspension system for snowmobiles having a steering linkage that connects a steering handle to a steering shaft on a ski and causes an outer ski to move outwardly and the inner ski to move inwardly toward the snowmobile during a turn from the snowmobile.

The invention is therefore based on the task of providing a vehicle which enables improved driving stability of the vehicle during straight-ahead driving at high speed in order to improve the driver's subjective perception of driving safety. According to the invention, this task is solved by the object of independent claim 1. Advantageous embodiments and further embodiments are the subject of the dependent claims.

Now, in order to specify a vehicle which enables improved driving stability of the vehicle, in particular when driving straight ahead at very high speeds, the present invention makes use, among other things, of the idea of installing linearly acting spring damper systems between the base frame and the tilt frame in the vehicle.

In particular, therefore, the present invention is based, inter alia, on the consideration that the vehicle has at least one linear-action spring damper system mounted between the tilt frame and the base frame in order to reduce the pendulum oscillations of the tilt frame that occur about the vertical zero position of the tilt frame.

According to an embodiment according to the invention, the vehicle thus comprises a base frame to which at least two sprung suspensions, in particular sprung wheel suspensions, for contact elements, for example wheels, which can be steered by means of a steering knuckle and are located on both sides of the longitudinal direction of travel, in each case transversely to the direction of travel, are attached. In addition, the vehicle according to the invention described here comprises a tilt frame which can be tilted in a tilt axis relative to the base frame, a steering tube which is rotatably attached to the tilt frame in a steering axis, whereby the steering tube automatically tilts with the tilt frame.

Furthermore, the vehicle according to the invention comprises at least one track rod which is connected to the track rod actuating element, wherein the track rod actuating element is linearly or rotationally movable and the steering torque is transmitted via a ro-tative connection in a guide element, wherein the track rod actuating element is moved linearly or rotationally by tilting the tilt frame about the tilt axis and, independently thereof, by rotating the steering tube about the steering axis in such a way that the steerable contact element generates a steering movement by the track rod actuating element by means of the at least one track rod and no substantial change in the camber of the contact elements and in particular of the wheels takes place during cornering.

According to the invention, the vehicle comprises at least one spring damper system which is suitable and intended to reduce the oscillating inclination of the tilt frame about the vertical zero position when driving straight ahead and at high speed and to improve the subjective driving safety perception for the driver.

According to at least one preferred embodiment, the spring damper system is arranged between the tilt frame and the base frame, whereby the tilt frame tilts about a tilt axis. This tilt is preferably triggered by a tilt or movement of the driver. Preferably, the tilt frame and the driver tilt together around this tilt axis.

The spring damper system preferably comprises at least two spring damper units arranged vertically (can also be inclined inwards) and at a horizontal distance symmetrically to each other, which preferably have springs and/or hydraulically acting damper systems. The springs and/or hydraulically acting damper elements are preferably also arranged vertically and at a horizontal distance from each other. Further preferably, the spring damper system is arranged between a base frame and a tilt frame and thereby acts on both sides and simultaneously, in particular in each tilt direction.

Preferably, each spring damper unit is arranged on the tilt frame by means of a first mounting point and on the base frame by means of a second mounting point. When the vehicle is travelling in a straight line, the first mounting point and the second mounting point are arranged in a linear axis to each other, which, when travelling in a straight line, runs in particular vertically (does not have to be) through the tilt frame and/or the base frame.

The horizontal and symmetrical distances of the pick-up points on the tilt frame and the distances of the pick-up points on the base frame can be different in the vertical zero position of the tilt frame, but usually lie on a common horizontal line.

Furthermore, each spring damper unit has a distance to the tilt axis at the upper mounting point in a horizontal direction, which runs virtually through the tilt frame.

Furthermore, each spring damper unit has a distance to the tilt axis at the lower mounting point in a horizontal direction, which runs virtually through the base frame. Particularly preferably, the tilt axis is arranged centrally between the spring damper units so that the distance of the left spring damper unit to the tilt axis and the distance of the right spring damper unit to the tilt axis are equal.

For this purpose, the spring damper units can also have a distance to the tilt axis in the vertical direction, which runs virtually through the base frame.

When the tilt frame swings to the left, the distance between the first and second pick-up points of the left-hand compression spring element is reduced, resulting in an increased compression spring force and, in conjunction with the effective distance of the left-hand spring damper unit from the tilt axis, an increased moment acting to the right or positive moment depending on the tilt angle on the tilt frame towards the vertical zero position. At the same time, the distance between the first and second pick-up points of the right-hand compression spring element is increased, which in turn results in a reduced compression spring force and, in conjunction with the distance of the right-hand spring damper unit, in a reduced moment acting to the left or negative moment as a function of the tilt angle on the tilt frame towards the vertical zero position. Thus, the sum of the moments acting to the right and left results in a moment acting to the right on the tilt frame inclined to the left towards the vertical zero position.

Due to the arrangement shown, in that the pick-up points at the bottom of the spring damper unit are arranged at a distance g below the tilt axis, an increasing left-hand effective distance and a decreasing right-hand effective distance are created as the tilt frame tilts to the left, which, in conjunction with the reduced left-hand distance for the left-hand spring damper unit and the extended right-hand distance for the right-hand spring damper unit, creates a rightward-generating moment that is further amplified by the increasing tilt angle of the tilt frame towards the vertical zero position. This kinematic arrangement thus generates a reinforcing right-acting moment towards the vertical zero position for compression springs and damper units. In the vertical zero position, the effective distances are the same.

If the distance g is above the tilt axis, there is a decreasing effective distance and an increasing effective distance as the tilt frame tilts to the left.

If instead of the linear acting compression springs tension springs are used, the effect can be reversed.

By using different spring rates for the compression springs and damper rates for the damper elements and the corresponding arrangement of the lower mounting points on the base frame, the torque curve of the left or right spring damper unit and the resulting torque curve depending on the tilt angle of the tilt frame can be significantly influenced or adjusted to the driver's requirement.

This arrangement creates a moment acting to the left and a moment acting to the right on the tilt frame as soon as the tilt frame is tilted to the left or right from the vertical zero position.

This compression of the left compression spring and the extension of the right compression spring and their difference creates a positive moment to the right in the direction of the vertical zero position and vice versa when the tilt frame swings to the right.

When using a hydraulic damper element instead of a compression spring element, there is accordingly no compression spring force when the tilt frame swings to the left or right, but a damping force.

According to at least one embodiment, the spring damper units are preferably mounted rotatably or also vertically symmetrically in a corresponding bearing. With an advantageous direct connection of the spring damper system, for example via bolts arranged at the top and bottom, the spring damper system or both spring damper units have a counteracting effect on the vertical alignment of the tilt frame and generate a counteracting moment. The term "top" refers to the arrangement of the spring damper system or a spring damper unit on the tilt frame and the term "bottom" refers to the arrangement of the spring damper system or a spring damper unit on the base frame. In this arrangement, the spring elements, in particular the compression spring, and the damper elements act on the same side and in parallel.

In the vertical zero position of the tilt frame, the compression springs arranged on both sides may have no pre-tension or an increasing pre-tension.

If the compression springs have a pre-tensioning force on both sides, the compression springs and thus the spring damper system act on both sides.

If the compression springs have no pre-tensioning force on both sides, the compression spring and thus the spring damper system act on one side.

With an advantageous indirect connection of the spring damper system, for example via bolts at the bottom and via an elongated hole or an empty stroke at the top, only one of the spring damper units acts on the tilt frame when the tilt frame is tilted in connection with the distance f. This has the advantage that a centring effect on the vertical position of the tilt frame is created in the vertical zero position. This has the advantage of creating a centring effect on the vertical position of the tilt frame in the vertical zero position. This centring effect can be adjusted by changing the preload of the spring, which is preferably designed as a compression spring or a tension spring. In this arrangement, the spring elements, in particular compression springs, and the damper elements act on one side.

In addition, two or more compression springs with different spring rates, basic lengths and empty strokes can be installed in the spring damper units. This allows non-linear compression spring characteristics to be generated depending on the tilt angle. For this purpose, the damper element can also be fixed with an idle stroke in the upper mounting point and thus act unilaterally. Due to the one-sided effect of the damper element, it is possible to variably adjust the compression and rebound stages, for example by setting the compression stage higher than the rebound stage in the hydraulically acting damper element. This arrangement allows the spring damper characteristic to be made variable.

This makes it possible to produce a spring damper system acting on one side and/or on the same side, consisting of two different spring units with variable moment characteristics when the tilt frame is tilted or swayed, in order to minimise the swaying tendency around the vertical zero line.

The springs of the spring damper units are therefore preferably compression springs, tension springs, gas pressure springs, gas tension springs or similar. The characteristic curves of the spring designs can be linear, progressive or degressive.

The spring elements or damper elements of the spring damper unit can preferably be optionally connected or arranged in series or in parallel, depending on which spring or damper characteristic or counteracting spring force or damper force is to be generated by tilting the tilt frame as a function of the tilt angle and the tilt angle speed about the vertical zero position of the tilt frame.

As mentioned above, the spring elements can be mechanical compression springs or tension springs or gas compression springs or gas tension springs. In addition, rubber elements or combinations of the listed spring types would preferably also be conceivable. Compression springs and tension springs can advantageously be designed with different spring rates in N/mm, with the particularity that tension springs have a pre-tensioning force in the zero position, whereas compression springs usually do not. The preload of the compression spring can be continuously adjusted by means of a linear adjustment unit. The adjustment of the preload of the compression spring can be carried out by an electric and/or hydraulic and/or mechanical adjustment unit by the driver.

The damper elements acting via a hydraulic fluid preferably have adjustable rebound stages or adjustable compression stages in a separating piston of the damper element. These are preferably effective when the hydraulic fluid in the damper element is subjected to tensile or compressive stress, and the hydraulic medium flows through spring-loaded valves in the separating piston from an upper to a lower chamber, depending on whether tensile or compressive stress is present.

By means of a manual/electrical/hydraulic adjustment, the flow of the hydraulic medium through the separating piston of the hydraulic damping element can be set in a range from 0 to 100%. Thus, it is also possible to block the spring damper unit at 0% flow of the hydraulic medium through the separating piston and thus to fix the inclination of the tilt frame in any position.

The use of two independently acting hydraulic damper elements is particularly advantageous, i.e. there is no hydraulic connection between the left and right damper elements.

However, it is also conceivable that only one spring element on the left and right or only one damper element on the left or right is used to reduce the pendulum tilt around the vertical zero position.

According to at least one embodiment, the hydraulic damper elements are preferably arranged on the left and right at a central distance d from the vertical plane of the tilt axis, parallel or symmetrically starting from a lower rotatable attachment point and directed inwards at an angle.

Furthermore, the spring damper system can preferably also be formed by at least two spring cylinder units, in which case no spring-loaded valves for the rebound and compression stages are provided in the aforementioned separating piston.

According to at least one further preferred embodiment, the hydraulic spring cylinder units are connected to each other via a hydraulic directional control valve and a hydraulic line, which preferably creates a hydraulic volume flow between the left and right spring cylinder units.

Hydraulic directional control valves can regulate, release or block the volume flow of the hydraulic media or change the direction of flow. Directional valves can preferably be adjusted manually, electrically or hydraulically or by combinations thereof, whereby the volume flow between the damper elements and thus the damping force can preferably be adjusted. Furthermore, the lower chamber of the spring damper system can be used as a hydraulic cylinder via a pressure generation unit, such as a hydraulic tank pump unit, a gas-pressurised gas cylinder or the like, and corresponding control valves in conjunction with actuators, such as switches, cylinders, electric actuators, magnetic actuators or the like, or sensors, which, for example, detect an impact angle, a speed or the like, and an electric control unit. This makes it preferably possible to control or regulate the inclination of the tilt frame as a function of a curve radius and/or a curve speed if the driver desires active support.

The preferred use of the directional control valves as electrically controllable shut-off valves for the hydraulic volume flow between the spring cylinder units means that the hydraulic volume flow between the left and right hydraulic cylinders is shut off and the tilt of the tilt frame is also blocked.

In addition, hydraulic tilt damping of the pendulum movement can preferably be achieved via a rotationally acting rotation damper. The hydraulic rotation damper can advantageously be connected directly or indirectly via a lever linkage to the tilt axle in the base frame. The adjustment of the rotation angle damping takes place when the tilt frame is turned to the left or right.

The listed elements can preferably be combined with each other in any geometric and/or functional arrangement.

This preferably also includes volume flow valves or pressure compensation tanks, which maintain a system pressure in closed hydraulic systems or are used for pressure compensation.

In addition, friction elements in the tilt axis can preferably also positively influence the pendulum oscillations of the tilt frame around the vertical zero position.

According to at least one embodiment, the track rod actuating element is movable via a guide element attached to the base frame and is preferably mounted so as to be movable linearly or rotationally. Preferably, the track rod actuating element is movable in the guide element by tilting the tilt frame and, independently thereof, by rotating the steering tube for actuating the at least one track rod in such a way that the track rod actuating element preferably performs a linear or rotational movement within the guide element.

According to at least one embodiment, a drive unit for driving the vehicle is mechanically attached to the tilt frame and/or to the base frame and/or to a swing arm of the drive axle.

According to at least one embodiment, the drive unit is preferably in the form of a pedal drive, an electric drive or an internal combustion engine drive or another form of drive.

According to at least one embodiment, the drive unit is advantageously accommodated in the tilt frame and a swivel gear is provided to bridge the swivel movement between the tilt frame and the base frame, the swivel gear preferably having at least one ball drive joint.

Furthermore, the complete disclosure content of the publications DE102014101087 A1, DE102012107154 A1 DE 10 2017 001 556 A1 and DE 10 2017 001 557 A1 is hereby incorporated by reference into this application. This means that each of the features disclosed in these publications is also part of the disclosure content of this application.

In the following, the invention described above is explained in more detail with reference to examples of embodiments and associated figures.

Showing:

Figure 1:
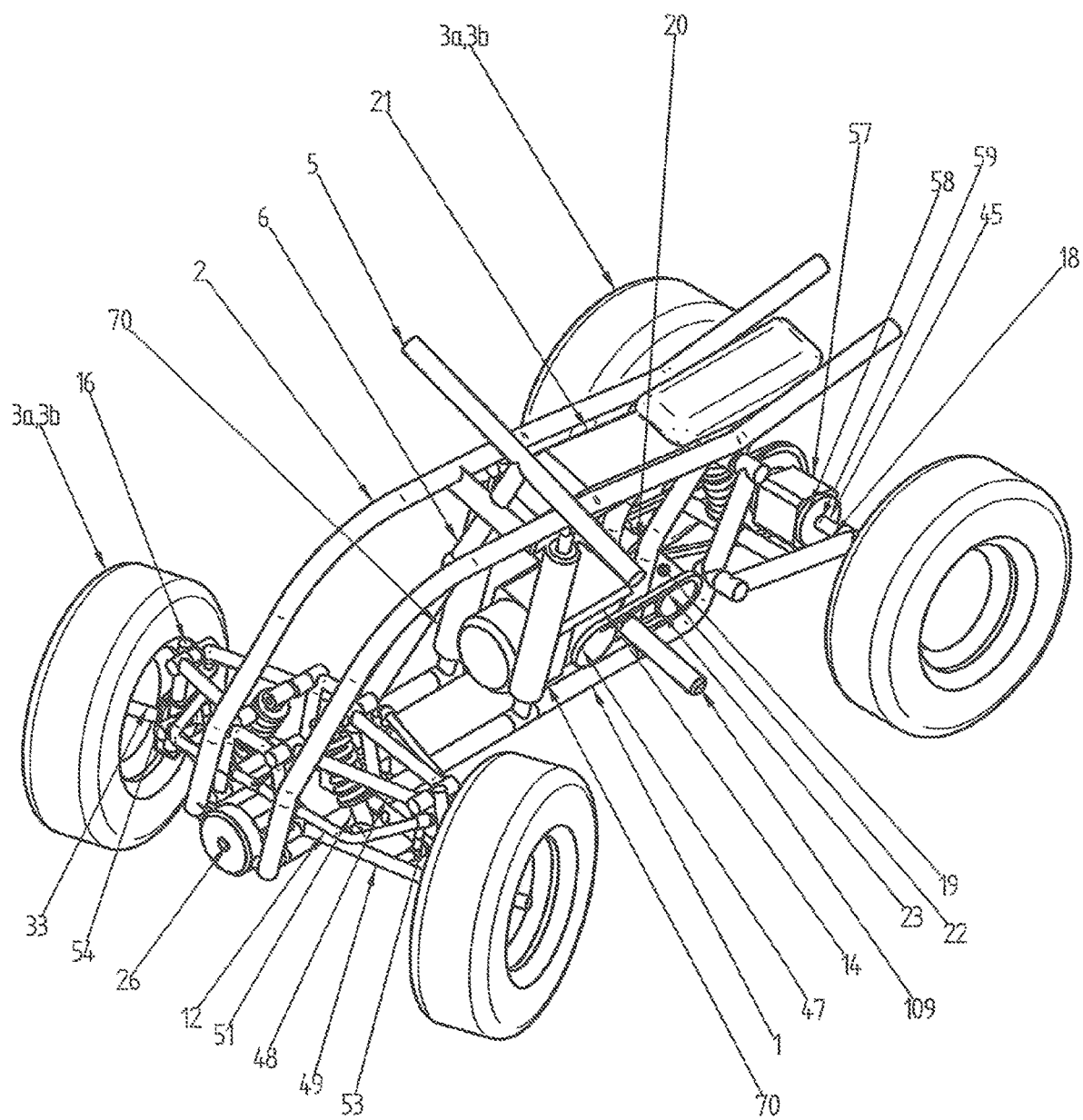
FIG. 1 shows a front perspective view of a vehicle according to the invention.

FIG. 1 shows a front perspective view of a vehicle according to the invention described here. A vehicle according to the invention with a base frame 1 and with a tilt frame 2, which is mounted tiltably in the tilt axis 26 in the base frame 1 and can be tilted by the driver shifting his weight when cornering. The respective wheels or skids are provided as contact elements 3a,3b on the lower wheel suspension 49 and the upper wheel suspension 48 of the base frame 1, wherein the front wheels 3a,3b are arranged rotatably relative to the base frame 1 on a respective steering knuckle 4 on the upper wheel suspension 48 and the lower wheel suspension 49 and serve to change the direction of travel of the vehicle.

The front wheels 3a are mounted with the steering knuckles 4 so that they can be steered about the swivel axis 16, whereby a camber angle or camber 54 remains almost unchanged when cornering.

It can also be seen that the vehicle has a base frame 1 and a tilt frame 2 is arranged thereon, which is suitable and intended to be tilted relative to the base frame 1. According to the figure shown, this is possible, for example, by means of the tilt axle 26. Furthermore, the vehicle has a handlebar 5 and a steering tube 6 connected to it. The front axle is designed as a steering axle and has an upper wheel suspension 48 and a lower wheel suspension 49. These wheel suspensions 48, 49 carry a wheel support 33 on both sides via a swivel axle 16, which can receive the contact elements 3a, 3b, whereby here the contact elements are designed as wheels. The front wheels 3a, 3b are fixed to the base frame 1, for example, via an independent wheel suspension, which can comprise spring damper elements 51 and one or more transverse links of different designs.

In order to achieve better stability also during driving, the steering device also has a stabiliser 12, which extends here, for example, between the upper and lower wheel suspension 48, 49 from one contact element 3a to the other contact element 3b.

According to this figure, a tilt frame spring damper system 75, which here consists of two spring damper units 70, is arranged approximately in the centre of the vehicle. This tilt frame spring damper unit 70 connects the base frame 1 with the tilt frame 2 and ensures that this tilt frame 2 can be tilted in a damped manner relative to the base frame 1. This spring damper unit also provides the restoring force that is required to "push" the tilt frame back into its original position. The reduction of the pendulum's inclination around the vertical zero position is of primary importance.

An energy storage unit 21, a drive unit 14 and a swivel gear 19 may be provided in the tilt frame 2. The drive unit 14 is, for example, an internal combustion engine and the energy storage 21 is, for example, a fuel tank that supplies the internal combustion engine with the necessary fuel.

Furthermore, the drive unit 14 has a swivel gear drive pinion 47 and swivel gear pinion 23 arranged thereon. A power transmission means 22, for example in the form of a toothed belt, is arranged on these pinions 47, 23. According to the figure, the rotation of the pinions can drive a swivel gear 19, which has a ball drive joint 20.

The use of the swivel gear 19 with the integrated ball drive joints 20 allow power transmission of the drive unit 14 via the power transmission means 22, the swivel wheel 23 from the tilt frame 2 to the base frame 1 via the Swing gear—drive pinion 47, the power transmission means 22 to the contact element 3a, 3b to be driven.

Here, the rear axle 45 is connected to the vehicle via a rocker arm 18. Furthermore, here the rear axle 45 is designed as a drive axle 58 and therefore has a drive shaft 59 and a differential gear 57.

Since the vehicle shown here is, for example, a type of quad, the vehicle has, for example, a footrest 109 on both sides, which is connected to the tilt frame, which a driver can place his feet on while driving.

A coupling rod 53 mechanically couples the stabilisation element to the lower wheel suspension 49.

Figure 2:
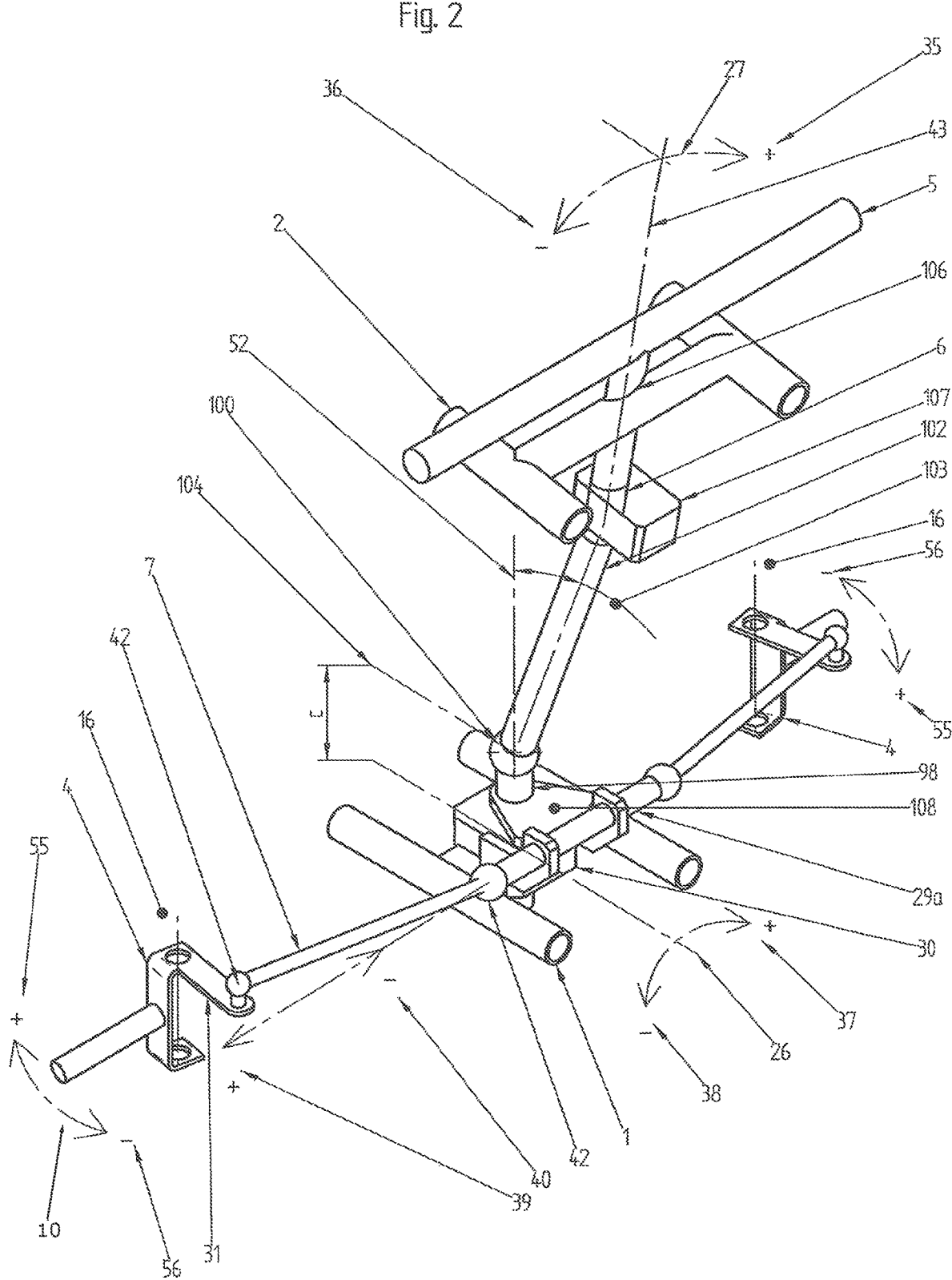
FIG. 2 shows a schematic representation of a steering gear with a linearly moved track rod actuating element.

FIG. 2 shows a schematic perspective view of a steering gear with a linearly moving track rod actuating element 29a. The steering arm 5 can be seen here, which is connected to a tilt frame 2 via a steering tube 6 and a linearly acting pivot bearing 106. The handlebar 5 can be turned about a steering axis 43 into positive turning 35 and negative turning 36. The steering tube 6 is connected to a steering column 102 via an upper universal joint 100. The steering column 102 has an angular steering column 103 by which the steering column 102 is inclined relative to a vertical zero position 52. At its lower end, the steering column 103 terminates in a lower universal joint 100, which is arranged at a distance c 104 from the tilt axis 26. The lower universal joint 100 connected to the steering column shaft 98, rotates about a vertical axis, is mounted in a guide element 30 and is connected to the steering column 102 by an angle steering column 103. On the steering column shaft 98 itself, the rotary gear segment 108 is connected to the track rod actuating element 29*a*, which is linearly displaceable transversely to the direction of travel and has an integrated toothed rack. The guide element 30 is firmly connected to the base frame.

The tilt frame can be tilted along a tilt axis 26 relative to the base frame 1 into a positive tilt 37 and a negative tilt 38.

The steering movement of the driver in the pivot steering angle 27 can also be assisted by an electric or electrohydraulic servomotor 107.

The steering system has a linearly moving track rod actuating element 29*a*, which is rotatably mounted in a guide element 30 via a steering column shaft 98 with the rotatable gear segment 108. Ball heads 42 are arranged on both sides of the linearly moving track rod actuating element 29*a*, on which track rods 7 are arranged. The track rod 7 opens into a further ball head 42, whereby this is connected to a steering knuckle 4 via a steering lever 31. This steering knuckle 4 can be rotated about a swivel axis 16 in positive rotation 55 and negative rotation 56. A positive rotation 55 corresponds to steering to the right in the direction of travel of the vehicle and a negative rotation 56 corresponds to steering to the left in the direction of travel of the vehicle. Due to the respective steering, a positive displacement 39 or a negative displacement 40 of the track rod can occur. This changes the steering angle 10 of the contact elements.

By variably dimensioning the distance c 104 in conjunction with the angle of the steering column 103 in conjunction with the universal joints 100, the positive displacement 39 and negative displacement 40 of the track rod drive element 29*a,b* can be influenced by the tilting of the tilt frame 2.

Figure 3:
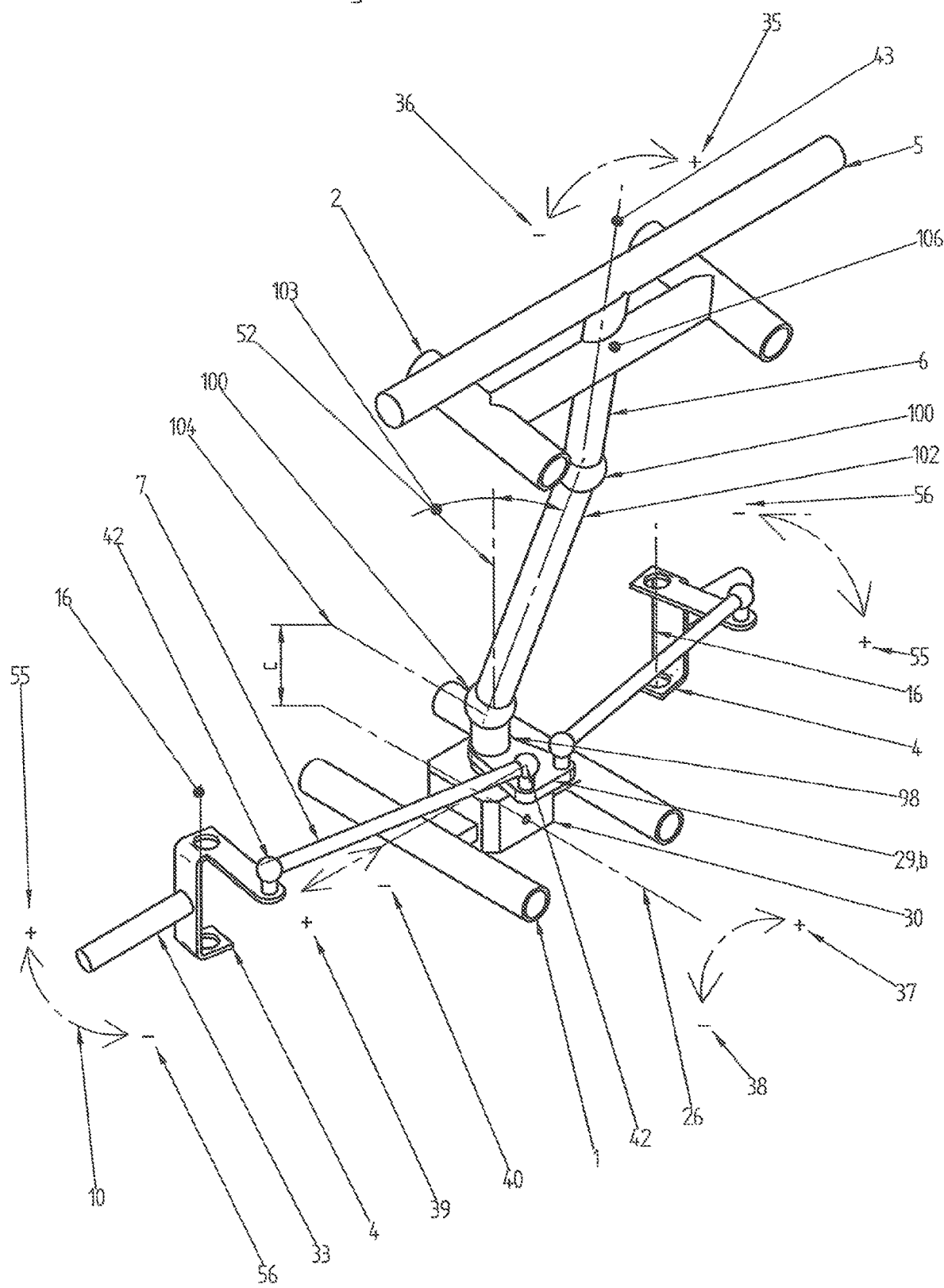
FIG. 3 shows a schematic representation of a steering gear with a rotationally moved track rod actuating element.

FIG. 3 shows a schematic perspective view of a steering gear with a rotationally moved track rod actuating element. This embodiment differs from the embodiment shown in FIG. 2 in that the track rods 7 are connected to a rotationally actuated track rod actuating element 29*b*. In this case, the tie rods 7 again have ball heads 42 with which they are arranged on a rotationally moved tie rod actuating element 29*b*, in that the rotationally moved tie rod actuating element 29*b* is rotatably mounted in the guide element 30 via a steering column shaft 98.

The other reference signs correspond to the features in FIG. 2; to avoid redundancy, these are not mentioned again here.

Figure 4:
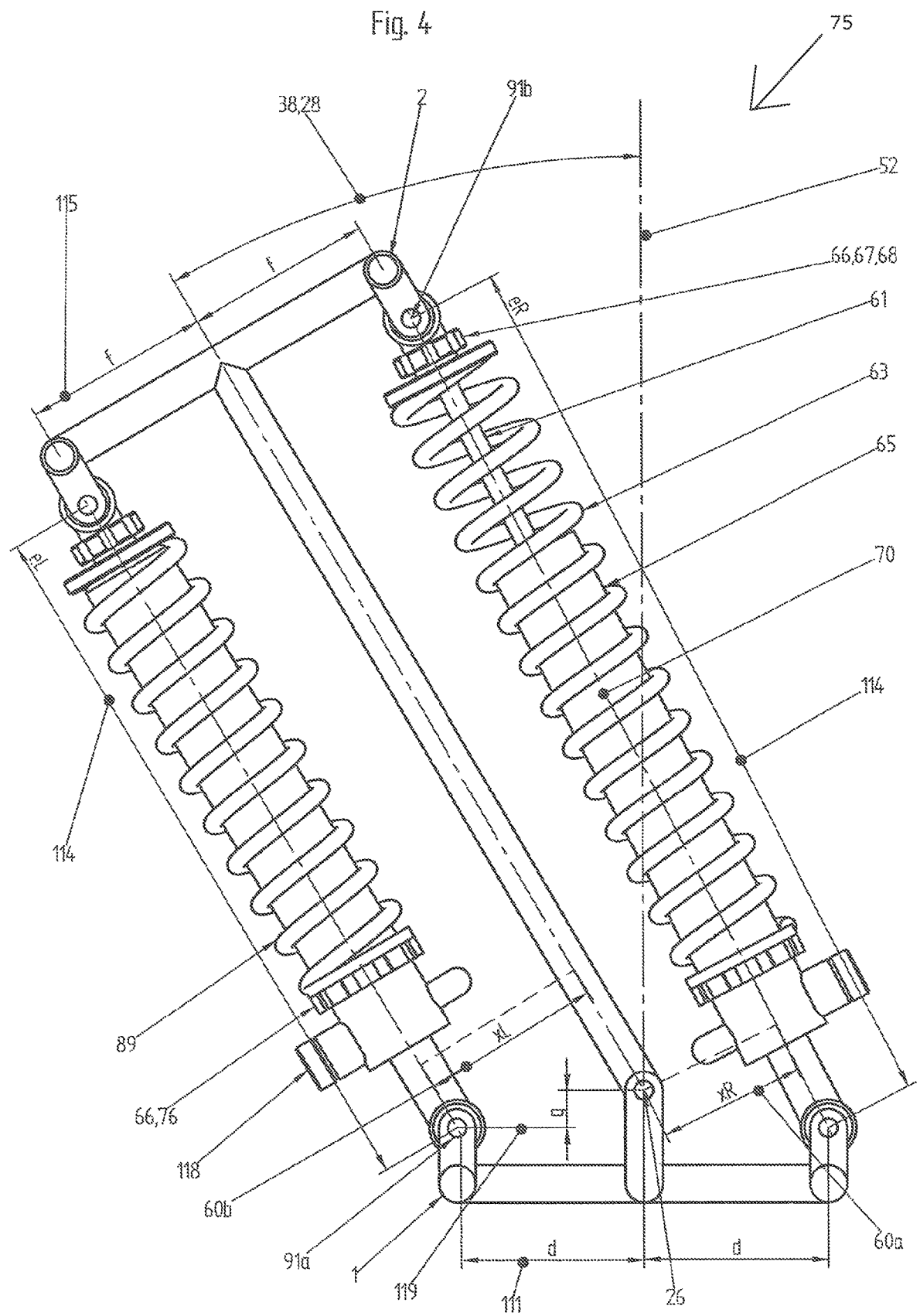
FIG. 4 shows a first embodiment of a spring damper system according to the invention.

FIG. 4 shows a first embodiment of a spring damper system 75 according to the invention. The spring damper system 75 has at least two spring damper units 70, each of which has a linear-acting spring 63 or linear-acting compression spring 89. The spring damper unit 70 is arranged directly on the tilt frame 2 via an upper mounting point 91*b* and directly on the base frame via the lower mounting point 91*a*.

The spring damper units 70 are connected to the tilt frame 2 and the base frame 1 via the mounting points at the bottom 91*a* and the distance d 111 or the mounting points at the top 91*b* and the distance f 115. In this embodiment, the spring damper units 70 are connected in a direct connection, such as bolts, to the tilt frame via the mounting points at the top 91*b* and to the base frame 1 via the mounting points at the bottom 91*a*.

FIG. 4 shows in particular a tilt of the tilt frame 2 to the left, whereby the tilt frame 2 tilts by the tilt angle 28 from the zero position 52, which the spring damper system 75 has when the vehicle is cornering or when the tilt frame swings to the left. Here, the reference sign 119 denotes a vertical distance g between the tilt axis 26 and the mounting points 91*a*.

It can be seen that when tilting to the left, the effective distance xL 60*b* at the left spring damper unit 70 increases and the distance eL 114 of the mounting points 91*a,b* decreases and correspondingly at the right spring damper unit 70, the effective distance xR 60*a* decreases and the distance eR 114 of the mounting points 91*a,b* increases.

As a result, when the tilt frame 2 swings to the left, there is a moment acting to the right towards the vertical zero position 52.

The linear-acting dampers 61 or linear-acting springs 63 are arranged in a parallel circuit 65 in this embodiment. The springs 63 are preferably linear-action tension springs or linear-action compression springs. Each spring damper unit 70 also preferably has a pressure compensation element 118 to prevent foaming of the hydraulic medium.

The reference sign 26 indicates the tilt axis 26 of the tilt frame 2, which here runs through the base frame 1. The reference sign 66 further indicates a manual and/or electrical and/or hydraulic adjustment of the springs 63, whereby here in particular the pre-tensioning force of the compression springs is adjustable.

Figure 5:
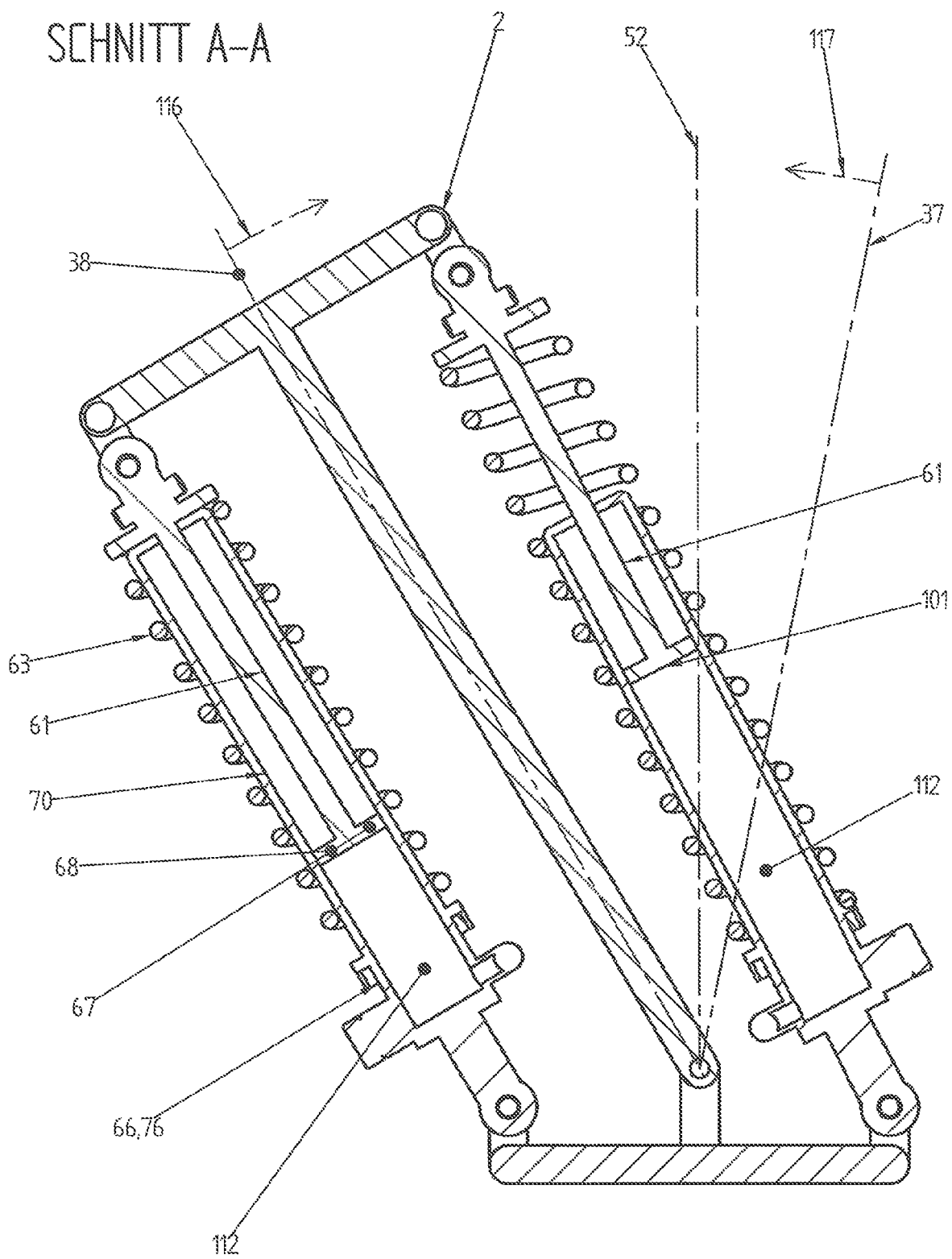
FIG. 5 shows a sectional view of the spring damper system according to the invention shown in FIG. 4.

FIG. 5 shows a sectional view of the spring damping system 75 shown in FIG. 4. The reference signs 67 and 68 refer to the above-mentioned damping of the rebound or compression stage, which can be adjusted via the adjustment 66. In this embodiment, a linear acting damper 61 is shown.

The reference sign 101 further denotes a separating piston which, in this embodiment, is displaced downwards in the left spring damper unit 70 when tilted to the left and upwards in the right spring damper unit 70, whereby the hydraulic fluid 112 is either displaced upwards (left spring damper unit) or downwards (right spring damper unit) as a result.

Furthermore, the positive restoring force 116 or the negative restoring force 117 of the spring damper units 70 as well as the positive inclination 37 or the negative inclination 38 of the tilt frame 2 are shown in this illustration.

The element 76 designates an adjustment element for setting a preload of the compression spring.

Figure 6:
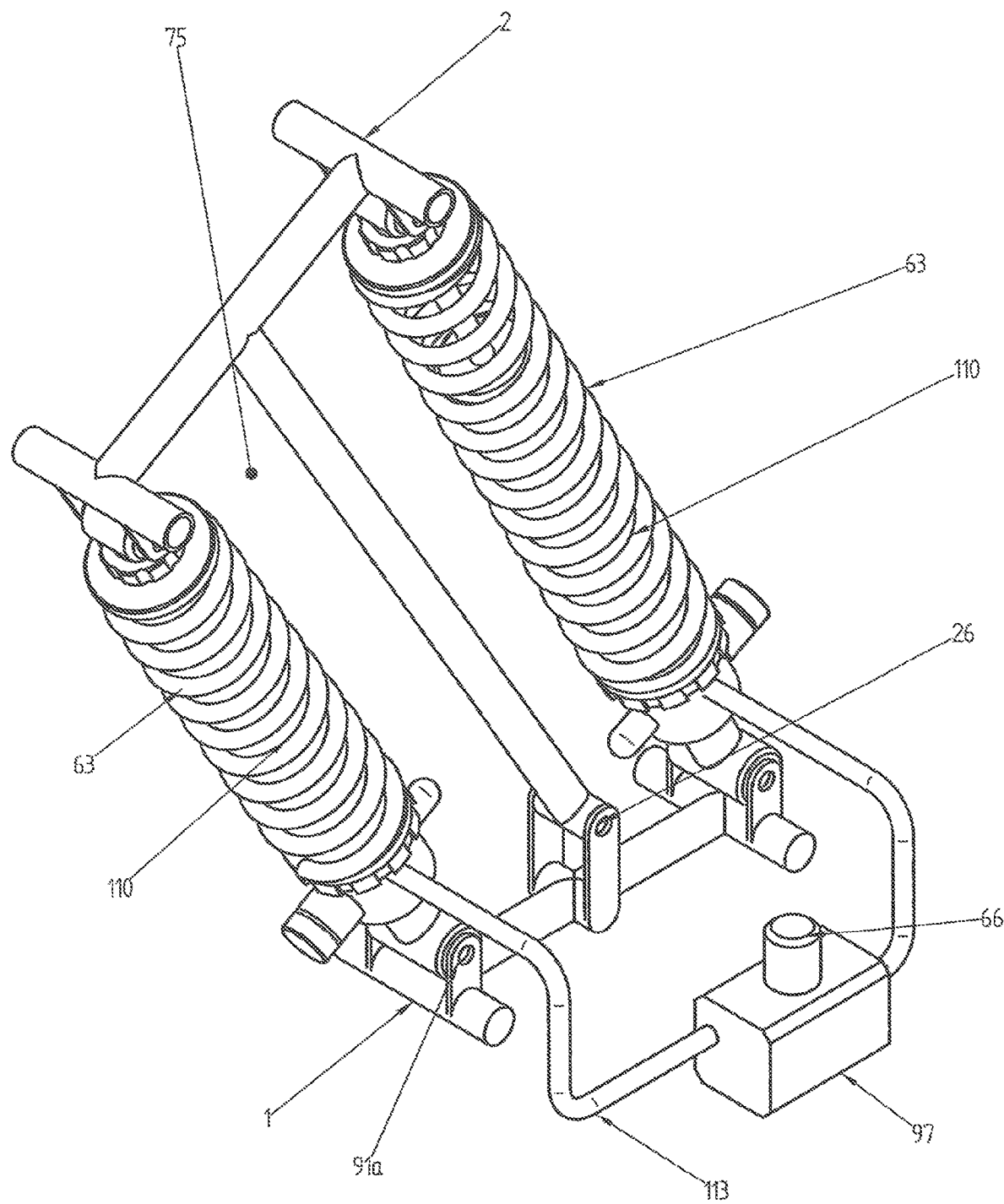
FIG. 6 shows a further embodiment of a spring damper system according to the invention.

FIG. 6 shows a spring damper system 75 with hydraulic connection 113 and a valve unit 97. In this embodiment, the spring damper system 75 has two spring cylinder units 110, which are connected in a corresponding manner to the base frame 1 and the tilt frame 2 and each have a linearly acting spring 63. In contrast to the embodiment shown in FIGS. 4 and 5, however, the spring cylinder units 110 are here arranged in a series connection 64. The arrangement of the spring cylinder units 110 on the tilt frame 2 or the base frame 1 is again effected by a direct connection via the mounting points 91*a* and 91*b*.

The valve unit 97 controls the flow, the flow rate and the flow direction of the hydraulic fluid 112 between the spring cylinder units 110. The valve units 97 are connected to the spring cylinder units 110 via a hydraulic line 113. The functions of the valve unit 97 can be adjusted via a manual and/or electrical and/or hydraulic adjustment.

Figure 7:
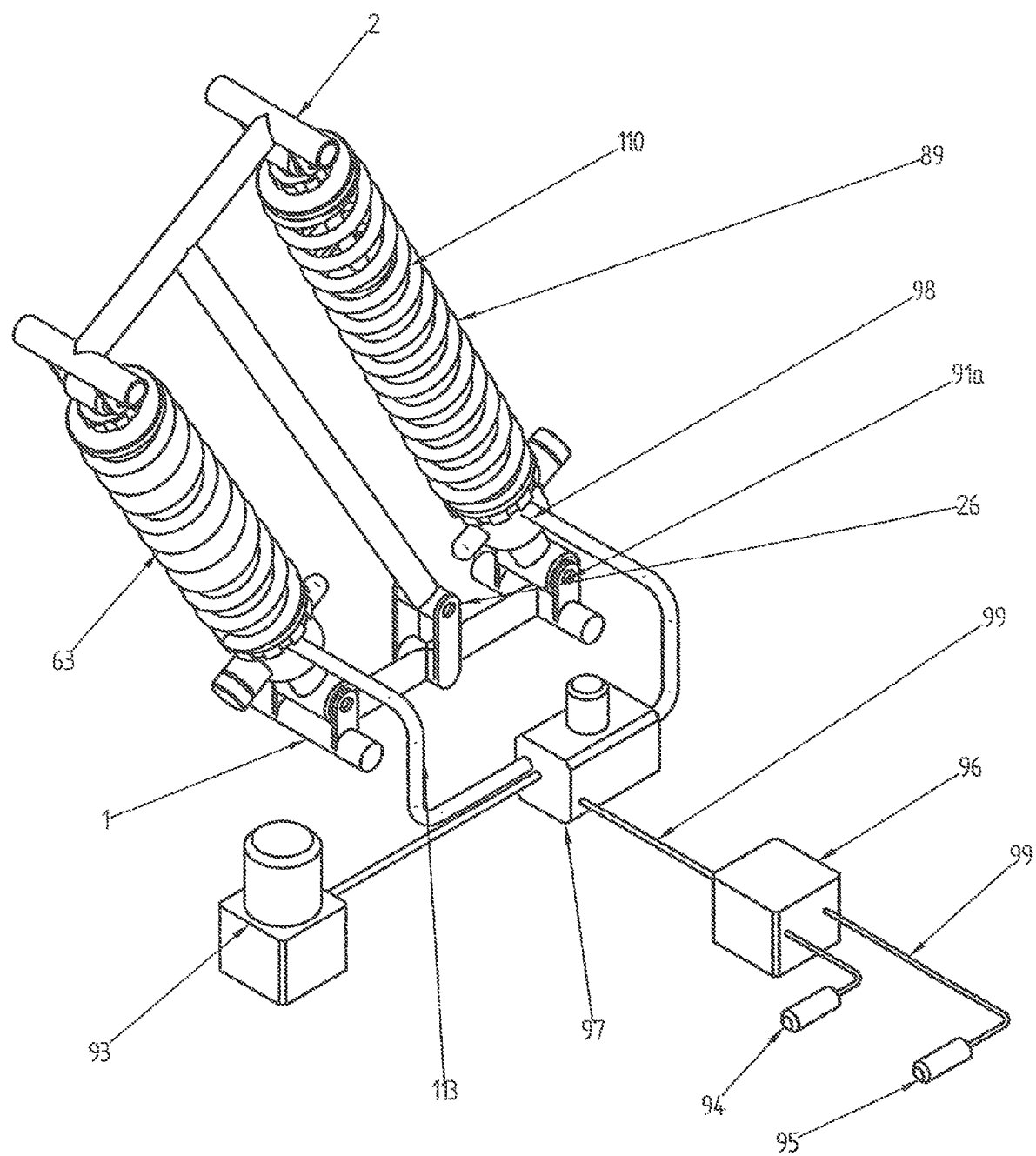
FIG. 7 shows a further embodiment of a spring damper system according to the invention.

FIG. 7 shows a further illustration of the spring damper system 75 with two spring cylinder units 110. In this illustration, the spring damper system 75 has the above-mentioned pressure generation unit 93, which controls or regulates the inclination of the tilt frame 2 as a function of a curve radius and/or a curve speed via the valve unit 97 in conjunction with an actuator 95, a sensor 94 and an electrical control unit 96, if the driver desires active assistance. The reference sign 113 further indicates the hydraulic line and the reference sign 99 the electrical connection.

Figure 8:
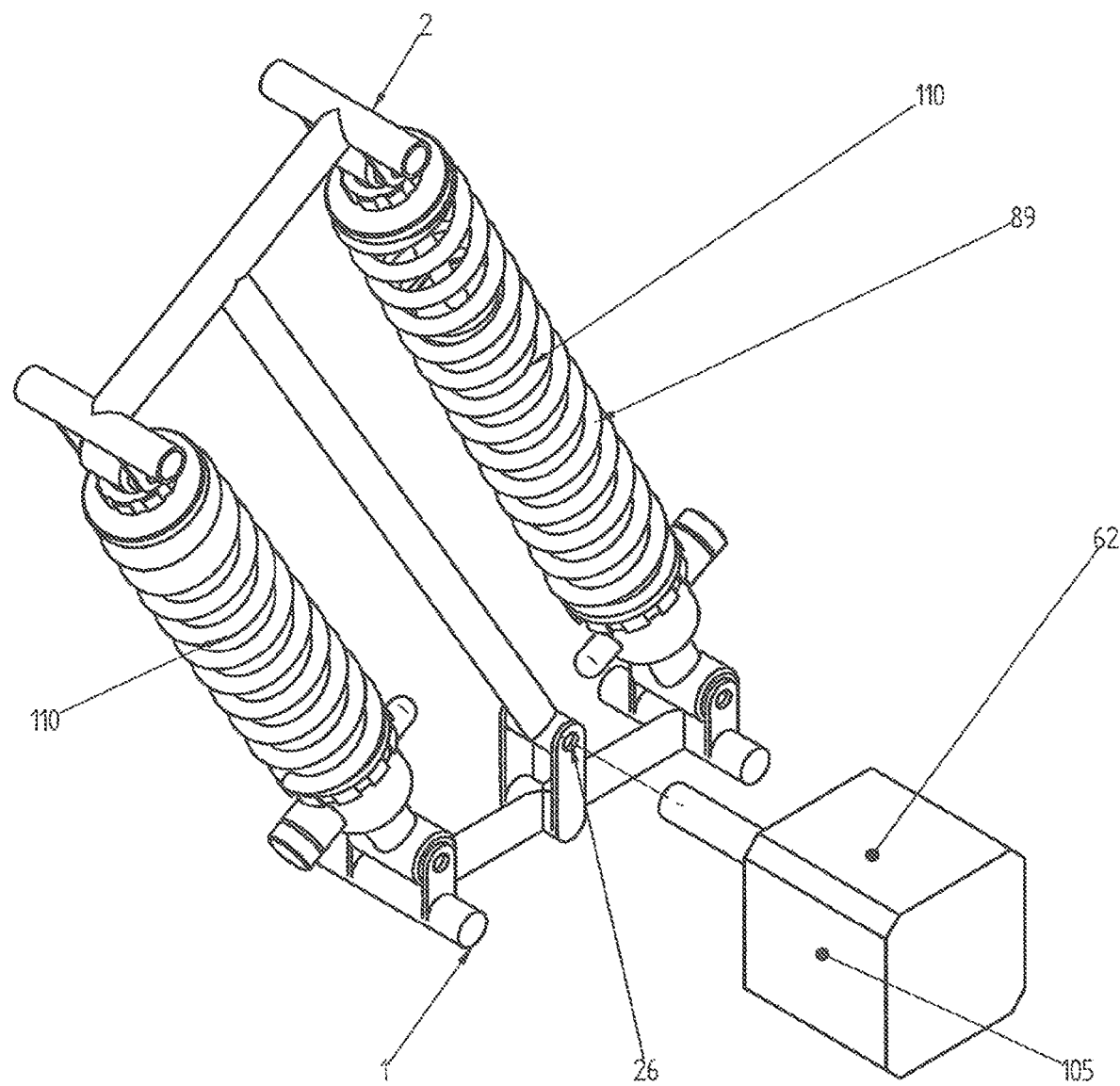
FIG. 8 shows a further embodiment of a spring damper system according to the invention.

FIG. 8 shows a further embodiment of a spring damper system 75 according to the invention, whereby in this embodiment it has a rotationally acting damper 62. In this illustration, the spring damper system 75 has two linearly acting compression springs 89. The rotationally acting damper 62 is preferably arranged in the tilt axis 26.

Figure 9:
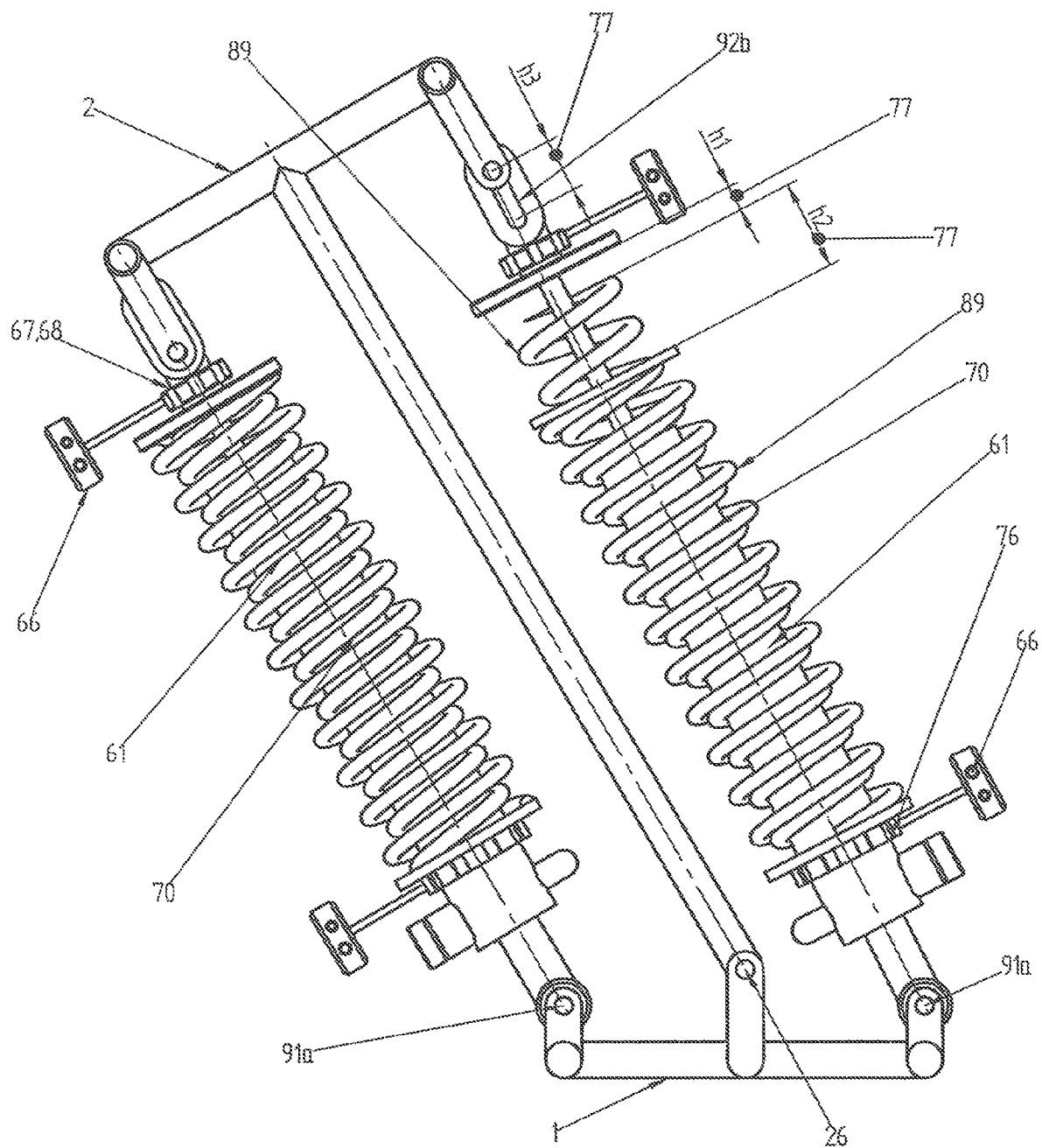
FIG. 9 shows a further embodiment of a spring damper system according to the invention.

FIG. 9 shows another embodiment of a spring-damper system 75 according to the invention. In this arrangement, the spring-damper units are directly connected to the base frame 1 at the lower mounting point 91a and indirectly connected to the tilt frame 2 via an elongated hole at the upper mounting point 92b. In this embodiment, however, the linearly acting damper 61 has been assigned an idle stroke h3, 77, the inner compression spring 89 an idle stroke h1, 77 and the outer compression spring 89 an idle stroke h2, 77.

Figure 10:
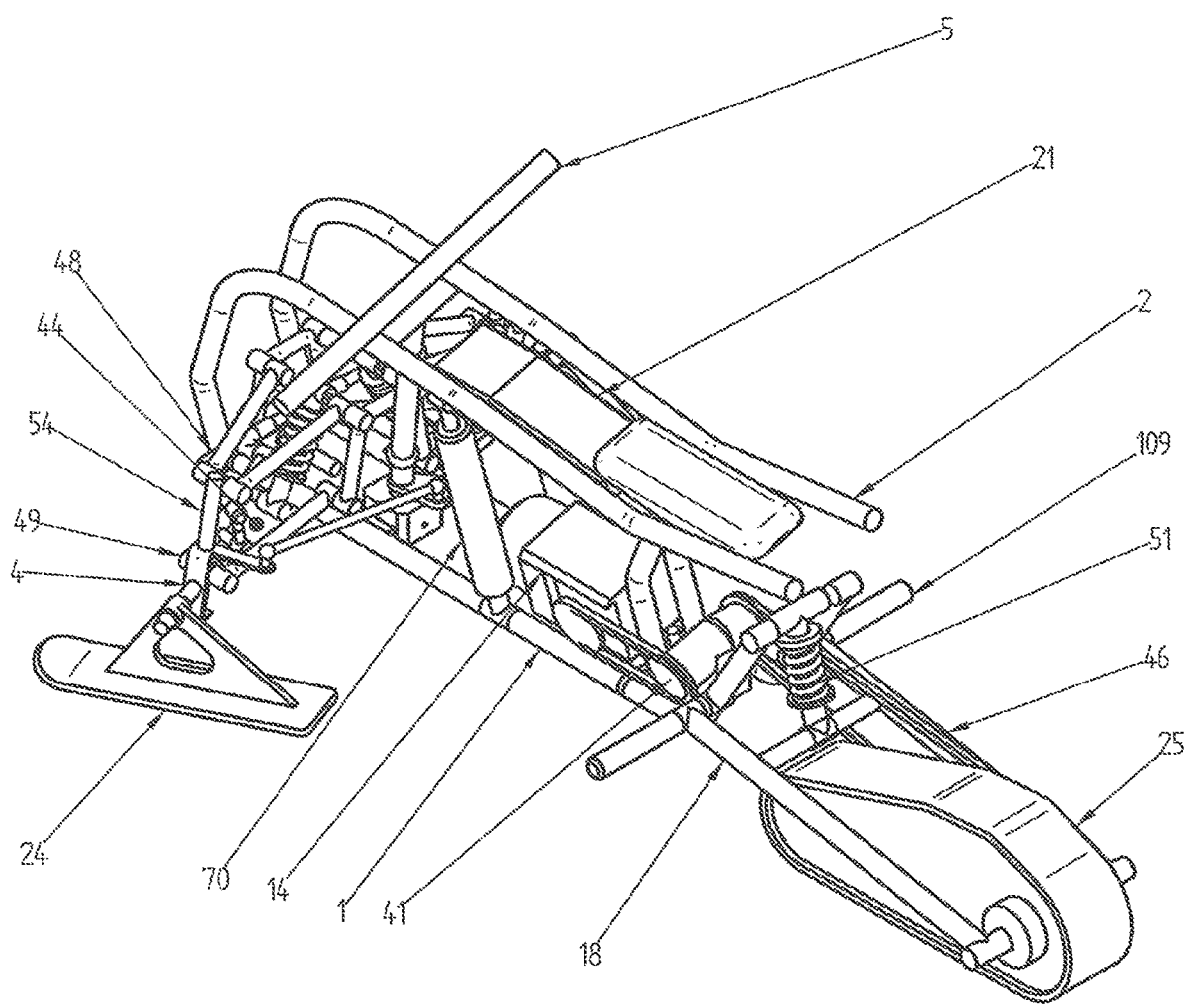
FIG. 10 shows a supplementary embodiment as a snowmobile.

FIG. 10 shows a supplementary embodiment of a vehicle as a snowmobile. Here, too, the base frame 1 and the tilt frame 2 that can be tilted relative to it can be seen. This tilt frame is also damped here by means of the tilt frame spring damper units 70 with respect to the tilt of the base frame 1. The steering device, which also has an upper and lower wheel suspension 48, 49, can also be seen here, whereby this steering device is again actuated by means of the handlebar 5 or by tilting the tilt frame. Instead of the wheels shown in the figure as contact elements, the snowmobile here has at least one snow skid 24, although there may well be two snow skids at the front. The runner(s) 24 is/are again held by steering knuckles 4.

An energy storage unit 21, a drive unit 14 and a drive pinion 41 may be provided in the tilt frame 2. The drive unit 14 is, for example, an internal combustion engine and the energy storage 21 is, for example, a fuel tank that supplies the internal combustion engine with the necessary fuel. The drive sprocket can drive a power transmission element, for example a drive chain 46, which transmits the power to a snow drive caterpillar 25. The snow drive caterpillar 25 is arranged on the snowmobile via a swing arm 18, whereby this swing arm 18 is also damped via a spring damper element 51.

Here, too, the driver can place his feet on a footrest 109 while driving. In the embodiment shown, however, the footrest 109 has been firmly connected to the base frame 1.

The invention is not limited by the description and the embodiments. Rather, the invention encompasses any new feature as well as any combination of features, which also includes in particular any combination of the patent claims, even if this feature or combination of features is not itself explicitly indicated in the patent claims or the embodiment examples.

LIST OF REFERENCE SIGNS

1 Base frame
2 Tilt frame
3a, 3b Contact element (wheel, skid, caterpillar)
4 Steering knuckle
5 Handlebar
6 Steering tube
7 Track rod
10 Turn-in angle λ
12 Stabilising element
14 Drive unit (Pedal drive, combustion engine, electric motor)
16 Swivel axle
18 Swing arm
19 Swing gear
20 Ball drive joint
21 Energy storage unit
22 Power transmission means
23 Pivot wheel or pinion/swivel gear pinion
24 Snow skid
25 Snow drive caterpillar
26 Tilt axis
27 Pivot steering angle α
28 Tilt angle tilt frame β
29a linear track rod actuating element
29b rotary track rod actuating element
30 Guide element
31 Steering lever
33 Wheel carrier
35 positive rotation steering
36 negative rotation steering
37 Positive inclination of tilt frame 2
38 negative inclination of tilt frame 2
39 positive displacement track rod
40 negative displacement track rod
41 Drive pinion
42 Ball joint
43 Steering axis
44 Front axle
45 Rear axle
46 Power transmission
47 Swing gear—drive pinion
48 Upper wheel suspension
49 Lower wheel suspension
51 Chassis spring damper element
52 Vertical zero position Z
53 Coupling rod
54 Camber
55 Positive rotation of steering knuckle—direction of travel to the right
56 negative rotation of steering knuckle—direction of travel to the left
57 Compensating element, differential gear, differential gear
58 Drive axle
59 Drive shaft
60a,xR Effective distance right
60b,xL Effective distance left
61 Linear damper
62 Rotary damper
63 Linear-acting spring
64 Series connection
65 parallel connection
66 manual and/or electric and/or hydraulic adjustment
67 Rebound damper
68 compression damper
70 Spring damper unit
75 Spring damper system
76 Adjustment preload compression spring
77,h1, h2, h3 Idle stroke, free travel
89 Linear acting compression spring
91a Pick-up point bottom direct—bolt connection
91b Pick-up point—top direct—pin connection
92b Pick-up point—top indirect—slotted hole connection
93 Pressure generation unit
94 Sensor
95 actuator
96 Electrical control unit
97 valve unit
98 steering column shaft
99 electrical connection
100 Universal joint 101 Separating piston
102 Steering column
103 Angle steering column γ
104 Distance c (tilt axis—centre of universal joint)
106 Linear-acting pivot bearing steering column
107 Servo motor (Electric and/or Hydraulic) Steering
108 Gear segment
109 Footrest
110 Spring cylinder unit
111 Distance d of mounting points 91a on base frame 1
112 Hydraulic fluid
113 Hydraulic line
114 Distance eL, eR of one mounting point 91a on base frame 1 and one mounting point 91b on tilt frame 2 each
115 Distance f (of the mounting points 91b, 92b on the tilt frame 2)
116 positive restoring force/damping
117 negative restoring force/damping
118 pressure compensation element
119 vertical distance g between tilt axis 26 and mounting points 91a

The invention claimed is:

1. Vehicle with a base frame (1) having steerable, sprung suspensions (48, 49) on the base frame (1) and contact elements (3a, 3b) on the sprung suspensions (48, 49) that are configured to be steered by Ackerman steering, comprising
a tilt frame (2) tiltably mounted in a tilt axis (26) opposite the base frame;
a steering tube (6) rotatably attached to the tilt frame (2) in a steering axis (43) and configured to tilt with the tilt frame (2);
at least one track rod (7) connected to a linear track rod actuating element (29a) or a rotary track rod actuating element (29b); and
a lower universal joint (100) and an upper universal joint (100),
wherein the linear track rod actuating element (29a) is linearly movably mounted in a guide element (30), and the rotary track rod actuating element (29b) is rotatably mounted in the guide element (30),
wherein the linear or rotary track rod actuating element (29a, 29b) is displaced or rotated by tilting the tilt frame (2) about the tilt axis (26) and, independently thereof, by rotating the steering tube (6) about the steering axis (43), in such a way that the steerable contact element (3a, 3b) undergoes a steering movement by the linear or rotary track rod actuating element (29a, 29b) by means of the at last one track rod (7), and a slight change in a camber (54) of the contact elements (3a, 3b) present takes place during cornering, and
wherein the tilt frame (2) is connected to the base frame (1) via a spring damper system (75), the lower universal joint (100) is firmly connected to the base frame (1) via a steering column shaft (98) and the guide element (30), and the upper universal joint (100) is tiltably connected to the tilt frame (2) via the steering tube (6).

2. The vehicle according to claim 1, wherein the lower universal joint (100) is arranged at a distance c (104) from the tilt axis (26).

3. The vehicle according to claim 1, wherein the upper universal joint (100) is connected to the tilt frame (2) via a steering column (102) that is arranged at a steering column angle γ(103) relative to a vertical zero position Z (52).

4. The vehicle according to claim 1, wherein the spring damper system (75) comprises at least two spring damper units (70) arranged at a horizontal distance d (111) from one another.

5. The vehicle according to claim 4, wherein the at least two spring damper units (70) comprise at least two symmetrically vertical spring damper units (70).

6. The vehicle according to claim 1, wherein the spring damper system (75) is connected to the base frame (1) and the tilt frame (2) via lower (91a) and upper (91b) mounting points and acts on both sides and simultaneously.

7. The vehicle according to claim 1, wherein the spring damper system (75) is arranged between the base frame (1) and the tilt frame (2), and a spring damper unit (70) acts on one side on the tilt frame (2) and an opposite spring damper unit (70) does not act on the tilt frame (2) through an idle stroke (77).

8. The vehicle according to claim 1, wherein the spring damper system (75) comprises at least two spring damper units (70), and
wherein, in the spring damper units (70), a rebound damper (67), a compression damper (68), and adjustment and preload of the compression spring (63) are adjusted manually.

9. The vehicle according to claim 1, wherein a tilt angle β (28) of the tilt frame (2) is configured to be changed by the spring damper system (75), which comprises spring cylinders (110) arranged in parallel, which are configured to controlled or regulated via a control unit (96), which includes a pressure generation unit (93), a valve unit (97), sensors (94), and actuators (95).

10. The vehicle according to claim 1, wherein the spring damper system (75) comprise symmetrically arranged spring cylinders (110) and is connected via a hydraulic connection (113) to a valve unit (97) which has a manual adjustment (66).

11. The vehicle according to claim 1, wherein the spring damper system (75) comprises at least two spring damper units (70), and
wherein, in the spring damper units (70), a rebound damper (67), a compression damper (68), and adjustment and preload of a compression spring (63) are adjusted electrically in conjunction with a control unit (96) and sensors (94).

12. The vehicle according to claim 1, wherein the spring damper system (75) comprises at least two spring damper units (70), and
wherein, in the spring damper units (70), a rebound damper (67), a compression damper (68), and adjustment and preload of a compression spring (63) are adjusted hydraulically (66) in conjunction with a control unit (96) and sensors (94).

13. The vehicle according to claim 1, wherein the spring damper system (75) comprises symmetrically arranged spring cylinders (110) and is connected via a hydraulic connection (113) to a valve unit (97) which has an electrical adjustment (66).

14. The vehicle according to claim 1, wherein the spring damper system (75) comprises symmetrically arranged spring cylinders (110) and is connected via a hydraulic connection (113) to a valve unit (97) which has a hydraulic adjustment (66).

* * * * *